(12) United States Patent
Heimes

(10) Patent No.: US 9,256,699 B2
(45) Date of Patent: Feb. 9, 2016

(54) METHOD AND SYSTEM FOR LOW-REDUNDANCY E-MAIL HANDLING

(75) Inventor: Frank Heimes, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1905 days.

(21) Appl. No.: 12/305,341

(22) PCT Filed: Apr. 18, 2007

(86) PCT No.: PCT/EP2007/053789
§ 371 (c)(1),
(2), (4) Date: Dec. 17, 2008

(87) PCT Pub. No.: WO2008/000532
PCT Pub. Date: Jan. 3, 2008

(65) Prior Publication Data
US 2009/0282086 A1    Nov. 12, 2009

(30) Foreign Application Priority Data

Jun. 29, 2006    (EP) .................................... 06116311

(51) Int. Cl.
*G06F 17/00* (2006.01)
*G06F 17/30* (2006.01)
*H04L 12/58* (2006.01)

(52) U.S. Cl.
CPC .... *G06F 17/30958* (2013.01); *G06F 17/30943* (2013.01); *H04L 12/585* (2013.01); *H04L 51/12* (2013.01)

(58) Field of Classification Search
CPC ................... G06F 17/30958; G06F 17/30943; H04L 12/585; H04L 51/12
See application file for complete search history.

(56) References Cited

U.S. PATENT DOCUMENTS

| | | | |
|---|---|---|---|
| 6,496,849 B1 | 12/2002 | Hanson et al. | |
| 6,496,853 B1 * | 12/2002 | Klein | ............................. 709/206 |
| 7,113,948 B2 * | 9/2006 | Jhingan et al. | |
| 7,739,653 B2 * | 6/2010 | Venolia | ......................... 717/101 |
| 2002/0073157 A1 | 6/2002 | Newman et al. | |
| 2006/0095521 A1 | 5/2006 | Patinkin | |

* cited by examiner

*Primary Examiner* — Usmaan Saeed
*Assistant Examiner* — Paul Kim
(74) *Attorney, Agent, or Firm* — Steven M. Greenberg, Esq.; CRGO Law

(57) ABSTRACT

A method of low-redundancy e-mail handling, wherein: e-mail data is selected, attachments of e-mails comprised in the e-mail data are detached, stored and replaced with references accordingly, and wherein further e-mail threads comprised in the e-mail data are identified and split in separate e-mails, duplicates of e-mails are deleted while maintaining their e-mail references, differences between a first e-mail and an immediately preceding second e-mail of the same thread are identified, generating difference data, the first e-mail is replaced by the difference data, and a reference to the second e-mail is inserted therein, the e-mails and references to their predecessors and successors in the same thread are stored in a data storage, and a graph-based interface is generated for the stored e-mails and references, and an e-mail server computer device, e-mail client computer device, data processing program, computer program product, and computer data signal therefor.

14 Claims, 5 Drawing Sheets

METHOD AND SYSTEM FOR LOW-REDUNDANCY E-MAIL HANDLING

CROSS-REFERENCE TO RELATED APPLICATIONS

This application is a Submission Under 35 U.S.C. §371 for U.S. National Stage Patent Application of International Application Number PCT/EP2007/053789, filed 18 Apr. 2007, and entitled METHOD AND SYSTEM FOR LOW-REDUNDANCY E-MAIL HANDLING, which is related to and claims priority to European Patent Application Serial Number EP06116311.9, filed 29 Jun. 2006, the entirety of which are incorporated herein by reference.

TECHNICAL FIELD

The invention relates to a method of low-redundancy e-mail handling, and an e-mail server computer device, an e-mail client computer device, data processing program, computer program product, and computer data signal therefor.

BACKGROUND

In practical e-mail usage scenarios, users oftentimes receive e-mails that contain multiple other e-mails, for instance when forwarding or replying to e-mails containing long mail threads. In scenarios wherein multiple senders participate in a specific correspondence, a user may even receive an entire mail thread more than once, or a user may receive multiple, partially overlapping mail threads from different senders. Thus, substantial data redundancy occurs when automatically handling such e-mails in a traditional way.

Systems for e-mail handling, such as IBM Lotus Domino/IBM Lotus Notes, IBM Workplace Collaboration Services/IBM Workplace Managed Client and Microsoft Exchange/Microsoft Outlook typically do not avoid such redundancies. While IBM Lotus Domino and particularly IBM Workplace offer advanced data storage functionality by providing a relational database management system, they do not provide functionality to overcome such redundancies.

Patent application publication US 2002/0073157 A1 proposes a method and apparatus for presenting e-mail threads as semi-connected text in a single document. In this system, redundancies are removed by deleting redundant individual e-mail messages. However, most redundancies still remain after the mere deletion of duplicates of e-mail messages, such as redundancy occurring in partially differing e-mail messages, or e-mail redundancy across parallel e-mail-chains which can be totally equal (the receiver has received an e-mail-chain twice from different senders) or only partially equal (if the receiver has received sub or super e-mail-chains from different senders). Further, potential attachments and its duplicates are not handled, and e-mail bodies and e-mail headers are seen in their entirety. Thus, if two e-mail bodies are not completely equal, they are treated as completely different, so that in many cases, a high degree of redundancy is stored. Furthermore, there is no appropriate and easily accessible visualization of single e-mails, e-mail chains or even e-mail threads.

Thus, conventional handling of such complex e-mail thread structures may lead to inefficient accessibility of e-mail information presented on an interface and to wastage of e-mail storage in both the e-mail server program and the e-mail client program, particularly when comprising e-mail replicating functionalities.

Consequently, it is an object of the present invention to provide a method for low-redundancy e-mail handling that reduces the amount of e-mail data to be stored to a minimum and that allows for efficient e-mail accessibility.

SUMMARY

This object is achieved by the features of each of claims 1 and 13 to 17.

The invention according to claim 1 is a method of low-redundancy e-mail handling, wherein: e-mail data is selected; attachments of e-mails comprised in the e-mail data are detached and stored in a data storage, and references to the locally stored attachments are inserted in the e-mails accordingly; e-mail threads comprised in the e-mail data are identified and split into separate e-mails; duplicates of e-mails are deleted while maintaining their e-mail references; differences between a first e-mail and an immediately preceding second e-mail of the same thread are identified, generating difference data; the first e-mail is replaced by the difference data, and a reference to the second e-mail is inserted therein; the e-mails and references to their predecessors and successors in the same thread are stored in a data storage; a graph-based interface is generated for the stored e-mails and references, wherein a node represents an e-mail message and an edge represents a reference between e-mail messages, and the graph-based interface provides functionality of an e-mail inbox interface.

By detaching all attachments, storing them in a database and inserting references to these attachments in place in the respective e-mails, redundant storage of attachments is efficiently avoided. By splitting the various e-mail threads contained in the e-mail data into separate e-mail messages, messages and their relationships are identified by their message-id so that congruent messages can be identified even when they have been sent in separate e-mail chains/threads, particularly when duplicate messages are discarded to further reduce data redundancy.

To reduce e-mail data redundancy even further, differences between a first e-mail body and an immediately preceding second e-mail of the same thread are identified, generating difference data; the first e-mail is replaced by the difference data, and a reference to the second e-mail is inserted therein. Thus, partial overlaps between e-mails are removed and the relationship between these e-mails is preserved. In an embodiment, this technique can also be expanded to the e-mail header or parts of the e-mail header, or other parts in which redundancy can occur.

By storing e-mails and references (including the reference type) in a data storage, such as a relational database or a set of XML files, information can be efficiently stored and accessed and it is enabled to automatically evaluate e-mail thread information and generate advanced representations of e-mail threads. By generating such a graph-based interface, a view of the evolution, the changes and the correlation of all available e-mail messages of a mail thread is presented, and the information to be presented in a conventional e-mail "Inbox" is reduced by combining all messages of an e-mail thread in a single tree or activity and an improved general overview is provided.

As a result, the method of the present invention provides such a normalization of e-mail data, so that the amount of data stored is reduced to a minimum. All attachments are stored only once, unique messages are stored only once as well, similar messages are reduced to its differences, and a data basis is provided for advanced e-mail presentation.

The inventions according to claims 13 and 14 provide an e-mail server computer device and an e-mail client computer device that comprise a data storage and a data processor configured to execute the method of present invention, as will be further put forward in the detailed description.

The e-mail server computer device comprises an interface export component to provide the generated graph-based interface, after having processed the e-mail data locally on the server according to the method of the present invention, to an e-mail client that generates a visual user interface from the presented information and provides user access. In an embodiment, the server can comprise an e-mail data replication mechanism.

To locally process e-mail data on the client according to the method of the present invention, an e-mail client computer device comprises an e-mail data replication component in order to retrieve e-mail data from an e-mail server.

In a client-server configuration in which the method is carried out on a server, a client can be configured to access the server for any data retrieval and may be used only for access and visualization.

Claims 15 to 17 provide a corresponding data processing program, computer program product, and computer data signal and will be explained later.

The invention can be further embodied as specified in the subclaims that depend on the independent claims, as briefly outlined below and further described in the detailed description:

In an embodiment of the method according to claim 1, it is determined if an e-mail indicates that an attachment has been removed from the e-mail in a separate process and wherein further such an indication is replaced by a reference to the locally stored attachment on the condition of the attachment being comprised in the data storage. In this way, so called "dangling" references to attachments are repaired.

In a further embodiment, the graph-based interface is generated comprising: selecting an e-mail that has no predecessor as an initial e-mail; generating a spanning tree by starting from the initial e-mail and following its references to further e-mails; marking the edges of the spanning tree according to the type of references/relationships between e-mails, and visually rendering the spanning tree on a graphical user interface. Further, the spanning tree can be rendered as an ary tree structure or can be rendered as a flow-chart. The graph-based interface may selectively display detailed e-mail information based on parameter settings, showing a selection of one or more of the following: message-id, subject, sender, e-mail body, e-mail header. Further, additional information related to an e-mail may be displayed that is collected from external sources.

In an embodiment of the method, when generating the difference information between two e-mails, the differences between the first e-mail and the immediately preceding second e-mail of the same thread are identified by comparing the bodies of said e-mails, and may be further selectively identified by comparing header fields based on parameter settings.

In a further embodiment, storing the e-mails in the data-storage is performed using a data structure comprising the following fields: message-id, header, body, predecessor, successor, and reference information may be stored in field predecessor and in field successor, comprising the message-id of a referenced e-mail and a reference type identifier.

The invention and its embodiments will be further described and explained using several figures.

DETAILED DESCRIPTION

Figure 1:
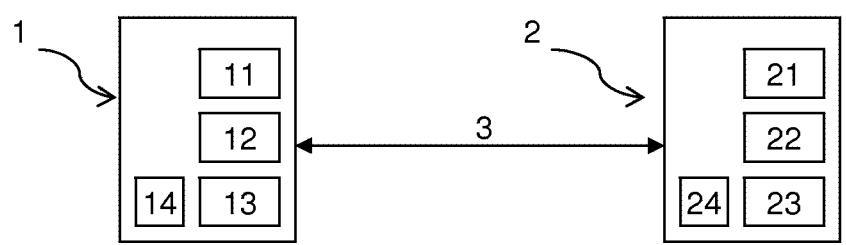
FIG. 1 is a block diagram showing a general system overview of an embodiment of the present invention.

FIG. 1 gives a system overview of embodiments of the present invention. E-mail server computer system 1 is coupled to e-mail client computer system 2 over communications link 3.

In one embodiment, server 1 comprises an e-mail data normalizer 11 to normalize e-mail data and thus remove redundancies in multiple correlating e-mail threads. Further, server 1 comprises an interface generator 12 to generate a graph-based interface for providing presentation and handling of e-mails. Relational database 13 stores e-mail data, such as individual e-mail messages and references between e-mails and other information, as will be described below in more detail. In different embodiments, database 13 may also be implemented using one or a set of flat files or XML-files. Interface export component 14 provides the graph-based interface to an e-mail client 2, which uses its interface generator 22 to render a graphical user interface appropriately to enable user interaction.

Thus, the generation of the graphical interface itself takes place on the client side only, while component 12 on the server is a generator of an interface to access the normalized e-mail data. By this, a data structure is made available on the server which can then accessed via an interface/API by the e-mail client program. The e-mail client program finally does the visualization and generates the graphical user interface.

Alternatively, e-mail data replication component 24 of client 2 replicates e-mail data stored in database 13 of server 1 to its own local database 23. In this case, client 2 comprises its own e-mail data normalizer 21 similar to server data normalizer 11 discussed above, and its interface generator 22 is configured to generate a graph-based interface and render a graphical user interface (GUI) accordingly. Alternatively, interface generator 22 and the GUI rendering component can be implemented as two separate components.

Combinations of this alternative and the aforementioned alternative are possible. When using XML files instead of a database management system, common concepts of XML file handling can be used, such as XSLT, X-Path, and X-Query. Data normalizers 11 or 21 each contain functionality to perform difference identification (diff), depth-first-search, breadth-first-search, graph layout, and further means to perform appropriate portions of the embodiment of the method of present invention as described below with reference to FIG. 2.

Figure 2:
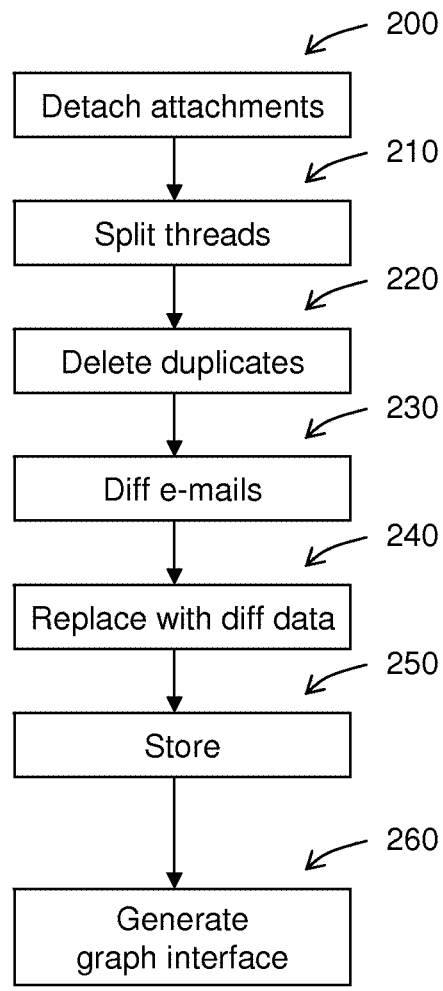
FIG. 2 is a flow diagram showing an overview of an embodiment of the method according to the present invention.

FIG. 2 is a flow diagram showing an overview of an embodiment of the method to normalize the e-mail data and generate an interface accordingly. In step 200, data normalizer 11 (or 21, respectively) detaches all attachments of e-mails in all interrelated e-mail threads and stores these attachments in database 13. In place of the attachments thus removed, references are inserted in the respective e-mails, referring to the attachments stored in the database. Further, "dangling references", i.e. references to attachments that have been manually removed from e-mails (or that are automatically removed when using the "Reply without attachments" functionality of an e-mail client) and that are stored in the database, are located and replaced with proper references to the stored attachments as well.

In step 210, the data normalizer splits all message threads into separate e-mail messages, which are identifiable by their respective individual message-id. This is particularly helpful when detecting identical messages across different mail threads, and deleting such duplicates in step 220.

In step 230, differences between e-mails of threads are identified in an iterative procedure. In order to identify these differences, it is not necessary to compare a particular e-mail with all the other e-mails but, since the probability of greatest similarity between e-mails is largest for immediately successive e-mails, it is sufficient to iteratively compare each e-mail to its predecessor in the thread. Thus, first an e-mail that has no predecessor in a thread is identified, i.e. an e-mail that is the beginning of an e-mail thread, and the iteration is started on its immediate successor (now referred to as e-mail n). Then, the differences of e-mail n and its predecessor (e-mail n−1) are determined.

As part of this iteration, in step 240, each e-mail n is replaced by the respective difference information, on the condition that this amount of difference exceeds a certain threshold, and a reference to respective e-mail n−1 is inserted. The iteration is continued over the following e-mails of a thread and ends at the final message of a thread, i.e. the message having no successors. The difference information comprises not only the differing message elements, but also information about where these differing elements occur. Upon viewing such an e-mail that has been replaced by its difference information, the full e-mail information is reconstructed from the difference information and the information from its predecessor. When determining differences, it may be sufficient to compare e-mail bodies. Additionally, selected header fields may be included in the comparison.

In step 250, all single messages are stored in database 13 (or 23) together with their respective reference information relating to their predecessors and successors, and including information if a message was received as "To:", "CC:", "BCC:", etc. E-mails thus processed, and e-mail data prior to the application of the method presented here, may be stored in the database using a data structure comprising the fields identified and commented in the following table:

| Field Name: | Message-id | Header | Body | Predecessor | Successor |
|---|---|---|---|---|---|
| Comment: | primary key | not null | complete or diff | message-id and reference type | message-id and reference type | wherein reference type is of "To:", "CC:", "BCC:", "Reply", "Forward", etc.

Figure 5:
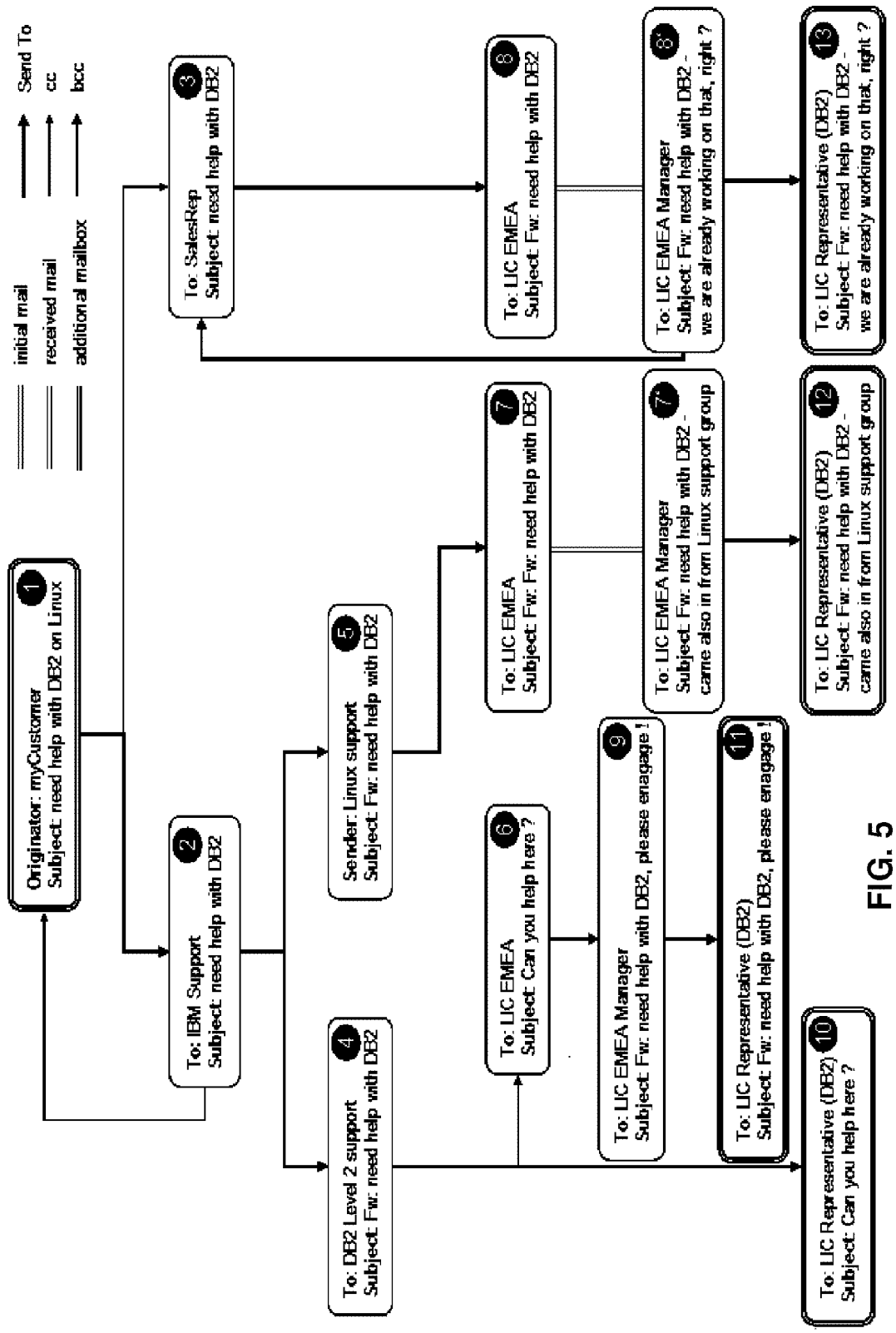
FIG. 5 is an illustration of a rendered user interface, and the graph of FIG. 5; and, FIG. 6 is a file-tree-type diagram showing redundant e-mail data corresponding to the graph of FIG. 5.

In step 260, a graph-based interface is generated for the stored e-mails and references, that can be used by the e-mail client program to create a visualization of the e-mail thread as illustrated in FIG. 5 and will be described later in more detail.

Figure 3:
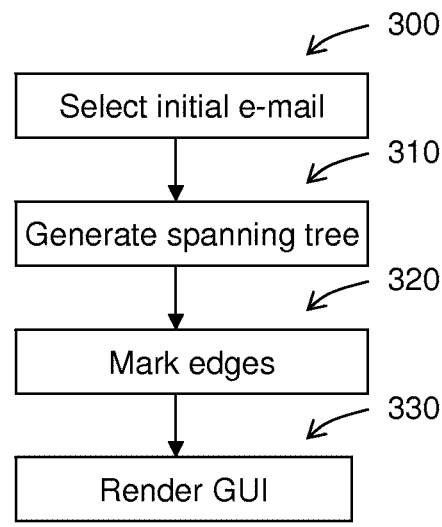
FIG. 3 is a flow diagram showing a detail of an embodiment of the method according to the present invention.

Now referring to FIG. 3, details of operation of graph-based interface generator 12 (or 22) are given. In step 300, an e-mail message is identified that has no predecessor and is selected as initial message. By initial message, the first message in a complete e-mail thread is referred to, even if e-mail chains might occur that start with different messages; in this case these e-mail chains are regarded mere as subsets and do not reach back to the initial sender.

Figure 4:
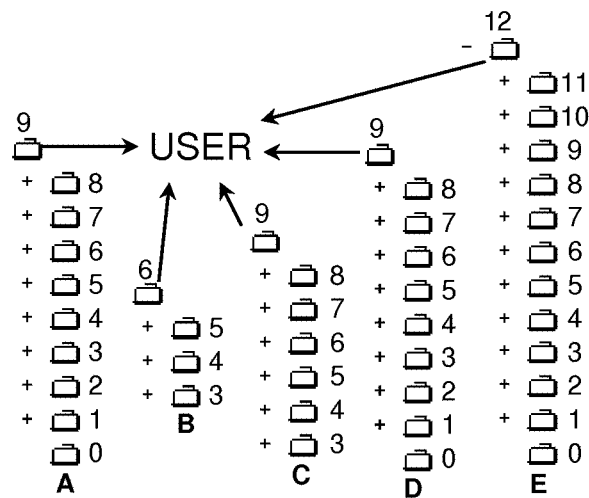
FIG. 4 is a file-tree-type diagram showing an exemplary set of e-mail data arranged in e-mail threads.

Using a graph exploration algorithm, a spanning tree is created in memory in step 310 by the interface generator. For this, breadth-first-search or depth-first-search algorithms are used and a tree is generated that represents all paths starting from the initial message ("0" in FIG. 4) to the last message in the thread (arriving at "USER" in FIG. 4).

While generating the tree, and using the additional reference information stored in the database, interface generator 12 marks the edges of the tree according to the reference type ("To:", "CC:", "BCC:", etc.) in step 320.

Rendering the graphical user interface based on the generated tree in step 330 is supported by an appropriate application programming interface (API) of the interface generator 12 on server 1 as well as by an appropriate API of interface generator 22 on client 2. Such a graphical user interface can be rendered in a flow-chart-style, or as a n-ary tree, as illustrated in FIG. 5.

In both types of client-server configuration (that is, a first type wherein the data processing according to the present method is performed on the server, and the client performs merely the rendering of the user interface, and a second type wherein data are replicated to the client which then performs both data processing and rendering of the user interface), after the data processing has been executed, information is still located in a "data layer" or "data component" either of the server or the client (13 or 23). To visualize the information, this data component must provide an interface/API so that an user interface component (the GUI rendering instance 22) can access this information.

In FIG. 5, a user interface rendered as a n-ary tree is illustrated. The numbers in circles refer to the message numbers used in FIG. 6, while identical numbers refer to identical messages. The user interface provides functions to select the level of detail that is presented to the user, starting by displaying message-ids only, additionally displaying the subject, additionally displaying the sender, etc., up to displaying full e-mail messages (header and body). Further, related information from additional and/or external sources can be comprised, for instance, a photo of the e-mail sender retrieved from an LDAP user repository, or a phone number, information about a user being online at the moment retrieved from an online messaging service, etc.

The graph visualizes all mail threads, their subsets, and branch mail threads, while each node of the tree represents an e-mail message and each edge represents a relationship reference between e-mail messages. Different colors and/or line types can be used to visually represent types of relationship between messages. For a better overview, the user is enabled to hide (collapse) subsets or branches of the whole tree, and if the complete graph cannot be displayed on the screen a "zoom graph to fit in windows"-functionality or common scroll bars can be used.

Figure 6:
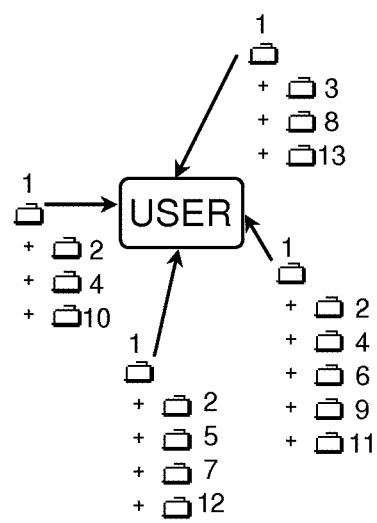

FIG. 6 demonstrates the advantageous effect of the present invention and the combination of data normalization and graph-based visualization. Starting from a group of interrelated threads containing 4 mail chains with a total of 19 messages, as shown is FIG. 6, the normalization effort results in minimizing the stored data to 13 messages by identifying 6 duplicates. Further, similarities between messages have been efficiently replaced by difference information where appropriate. Accordingly, in the graph of FIG. 5, the redundant presentation of FIG. 6 has been replaced by a graph that allows to easily identify the originator of the thread (marked as such in node 1) and navigate through the e-mails and their relationships efficiently since each e-mail is displayed only once, clearly showing relationships between e-mails.

CONCLUSION

A method and system for automated low-redundancy e-mail handling, as described herein, leads to less resource consumption on both e-mail servers and clients, and provides an efficient presentation of complex e-mail threads to avoid a user having to read whole mail topics and mail-chains multiple times, to reconstruct the correlation and combination of the e-mails of a complex thread, and to manually remove e-mail attachments.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

To avoid unnecessary repetitions, explanations given for one of the various embodiments are intended to refer to the other embodiments as well, where applicable. Reference signs in the claims shall not be construed as limiting the scope. The use of "comprising" in this application does not mean to exclude other elements or steps and the use of "a" or "an" does not exclude a plurality. A single unit or element may fulfil the functions of a plurality of means recited in the claims.

REFERENCE NUMERALS

1 E-mail server
2 E-mail client
3 Communication link
11 E-mail data normalizer
12 E-mail interface generator
13 Database
14 Interface export component
21 E-mail data normalizer
22 E-mail interface generator
23 Database
24 E-mail data replication component
200 Detach attachments and replace with references
210 Split threads into separate e-mail
220 Delete duplicate e-mails
230 Identify differences between a first and a second e-mail
240 Replace first e-mail with difference data
250 Store e-mails and references in database
260 Generate graph interface
300 Select initial e-mail
310 Generate spanning tree
320 Mark edges according to relationships
330 Render a graphical user interface

The invention claimed is:

1. A method of low-redundancy e-mail handling, comprising:
   selecting E-mail data comprising attachments;
   detaching and locally storing the attachments of e-mails in a data storage, and inserting references to the locally stored attachments in the e-mails;
   identifying E-mail threads in the e-mail data and splitting the E-mail threads into separate ones of the e-mails;
   deleting duplicates of the e-mails while maintaining references in the duplicates of the e-mails;
   identifying differences between a first e-mail and an immediately preceding second e-mail of a same one of the E-mail threads, and generating difference data for the identified differences;
   replacing the first e-mail with the difference data, and inserting a reference to the second e-mail in the difference data;
   storing the e-mails and references to their predecessors and successors in the same thread in a data storage; and,
   generating a graph-based interface for the stored e-mails and references, wherein a node represents an e-mail message and an edge represents a reference between e-mail messages, and the graph-based interface provides functionality of an e-mail inbox interface.

2. The method according to claim 1, wherein it is determined whether an e-mail indicates that an attachment has been removed from the e-mail in a separate process and wherein further such an indication is replaced by a reference to the locally stored attachment on the condition of the attachment being comprised in the data storage.

3. The method according to claim 1, wherein generating the graph-based interface comprises:
   selecting an e-mail that has no predecessor as an initial e-mail;
   generating a spanning tree by starting from the initial e-mail and following its references to further e-mails;
   marking edges of the spanning tree according to the type of references between e-mails; and,
   visually rendering the spanning tree on a graphical user interface.

4. The method according to claim 3, wherein the spanning tree is rendered as a n-ary tree structure.

5. The method according to claim 3, wherein the spanning tree is rendered as a flow-chart.

6. The method according to claim 1, wherein the graph-based interface selectively displays detailed e-mail information based on parameter settings, showing a selection of one or more of the following: message-id, subject, sender, e-mail body, e-mail header.

7. The method according to claim 6, wherein additional information related to an e-mail is displayed that is collected from external sources.

8. The method according to of claim 1, wherein the differences between the first e-mail and the immediately preceding second e-mail of the same thread are identified by comparing the bodies of said e-mails.

9. The method according to claim 8, wherein the differences are further selectively identified by comparing header fields based on parameter settings.

10. The method according to claim 1, wherein storing the e-mails in the data-storage is performed using a data structure comprising the following fields: message-id, header, body, predecessor, successor.

11. The method according to claim 10, wherein reference information is stored in field predecessor and in field successor, comprising the message-id of a referenced e-mail and a reference type identifier.

12. The method according to claim 1, wherein at least one XML-file and/or a database management system is used for the data storage.

13. A data processing system for low-redundancy e-mail handling comprising:
   a processor executing on a computer, the processor when executed in the computer causes the computer to perform the steps of:
   selecting E-mail data comprising attachments;
   detaching and locally storing the attachments of e-mails in a data storage and inserting references to the locally stored attachments in the e-mails;
   identifying E-mail threads in the e-mail data and splitting the E-mail threads into separate ones of the e-mails;
   deleting duplicates of the e-mails while maintaining references in the duplicates of the e-mails;
   identifying differences between a first e-mail and an immediately preceding second e-mail of a same one of the E-mail threads, and generating difference data for the identified differences;
   replacing the first e-mail with the difference data, and inserting a reference to the second e-mail in the difference data;
   storing the e-mails and references to their predecessors and successors in the same thread in a data storage; and,
   generating a graph-based interface for the stored e-mails and references, wherein a node represents an e-mail message and an edge represents a reference between e-mail messages and the graph-based interface provides functionality of an e-mail inbox interface.

14. A computer program product stored on a non-transitory computer usable storage medium, comprising computer readable program means for causing a computer to perform a method when said program is run on said computer, the method comprising:
   selecting E-mail data comprising attachments;
   detaching and locally storing the attachments of e-mails in a data storage, and inserting references to the locally stored attachments in the e-mails;
   identifying E-mail threads in the e-mail data and splitting the E-mail threads into separate ones of the e-mails;
   deleting duplicates of the e-mails while maintaining references in the duplicates of the e-mails;
   identifying differences between a first e-mail and an immediately preceding second e-mail of a same one of the E-mail threads, and generating difference data for the identified differences;
   replacing the first e-mail with the difference data, and inserting a reference to the second e-mail in the difference data;
   storing the e-mails and references to their predecessors and successors in the same thread in a data storage; and,
   generating a graph-based interface for the stored e-mails and references, wherein a node represents an e-mail message and an edge represents a reference between e-mail messages, and the graph-based interface provides functionality of an e-mail inbox interface.

\* \* \* \* \*